United States Patent

[11] 3,619,214

| [72] | Inventor | Milton S. Cohen |
| --- | --- | --- |
| | | Arlington, Mass. |
| [21] | Appl. No. | 784,022 |
| [22] | Filed | Dec. 16, 1968 |
| [45] | Patented | Nov. 9, 1971 |
| [73] | Assignee | Battelle Development Corporation |
| | | Columbus, Ohio |

[54] SELF-COOKING DISPOSABLE FOOD PACKAGES
23 Claims, 5 Drawing Figs.

[52] U.S. Cl. ............................................. 99/171 H,
99/358, 219/288
[51] Int. Cl. ............................................. B65d 81/34
[50] Field of Search ................................... 99/171, 171
H, 358; 219/288

[56] References Cited
UNITED STATES PATENTS

| 2,850,391 | 9/1958 | Gunsberg | 99/171 H |
| 3,062,663 | 11/1962 | Furgal et al. | 99/171 |
| 3,287,140 | 11/1966 | Brussell | 99/171 UX |
| 3,296,415 | 1/1967 | Eisler | 99/171 UX |
| 3,465,873 | 9/1969 | Munz | 99/171 UX |
| 1,913,442 | 6/1933 | Hanks | 219/288 |

*Primary Examiner*—Frank W. Lutter
*Assistant Examiner*—William L. Mentlik
*Attorney*—W. R. Hulbert ABSTRACT: A food package comprising a container whose interior surface defines a substantially closed cavity having a vapor vent in its upper portion, a pair of electrodes mounted within the lower portion of the cavity in spaced-apart relationship, and a food compartment disposed within the cavity above the electrodes.

SELF-COOKING DISPOSABLE FOOD PACKAGES

This invention relates to self-cooking disposable food packages.

It is a principal object of the present invention to provide a disposable food package which is capable of steam heating a food product contained therein. Other objects include providing a package of the type mentioned in which the food may be quickly heated and cooked from a frozen condition, operates on a convention line current, is self-regulating in temperature and cooking cycle time, is self-destructing for safety, and is commensurate in cost with currently available frozen food packaging; and also providing an inexpensive reusable assembly for safely connecting such a package to a standard AC powerline.

The invention features a food package comprising a container whose interior surface defines a substantially closed cavity having a vapor vent in its upper portion, a pair of electrodes mounted within the lower portion of the cavity in spaced-apart relationship and a food compartment disposed within the cavity above the electrodes. In preferred embodiments there is featured a container comprising an outer box of thermal and electrical insulating material and within the box a flexible sheet or film of electrically insulating, moisture resistant material gathered about the electrodes and food compartment and defining the interior surface of the container; electrodes extending sealingly through the flexible sheet; spacer assemblies above and below the food compartment; and a cooperating assembly for attaching the food package to electric line current comprising a guide bar, a pair of parallel side guides secured to the guide bar and a pair of electrical connectors projecting from the guide bar and positioned for insertion into the food package to engage the electrodes therein. Other objects, features, and advantages will appear from the following description of a preferred embodiment of the invention, taken together with the attached drawings thereof, in which:

Figures 1, 2, 3:
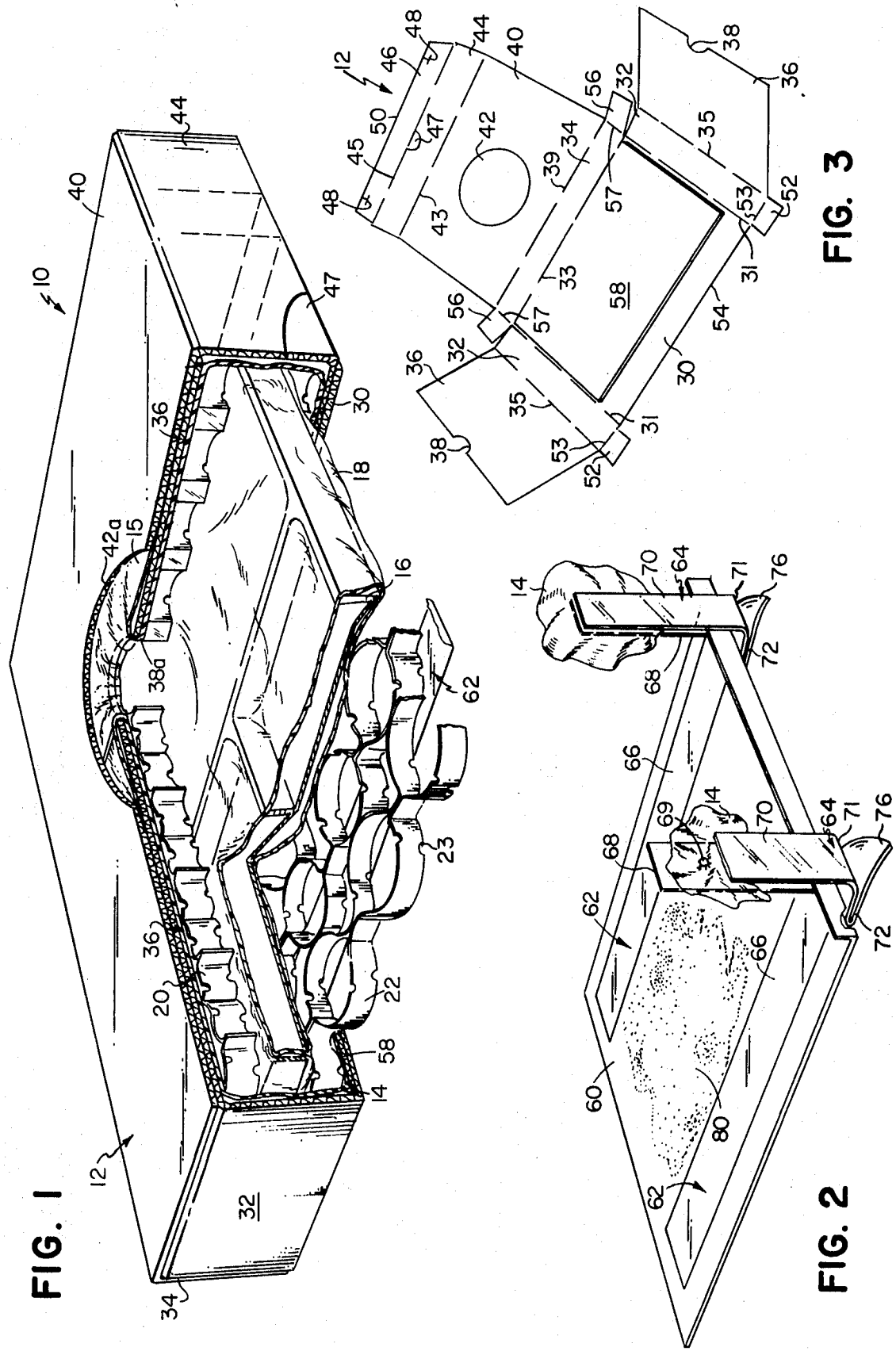
FIG. 1 is a perspective view, partially in section, of a food package embodying the present invention.
FIG. 2 is a perspective view of the electrode assembly of the food package of FIG. 1.
FIG. 3 is a perspective view of a box blank used in the food package of FIG. 1.
Figure 4:
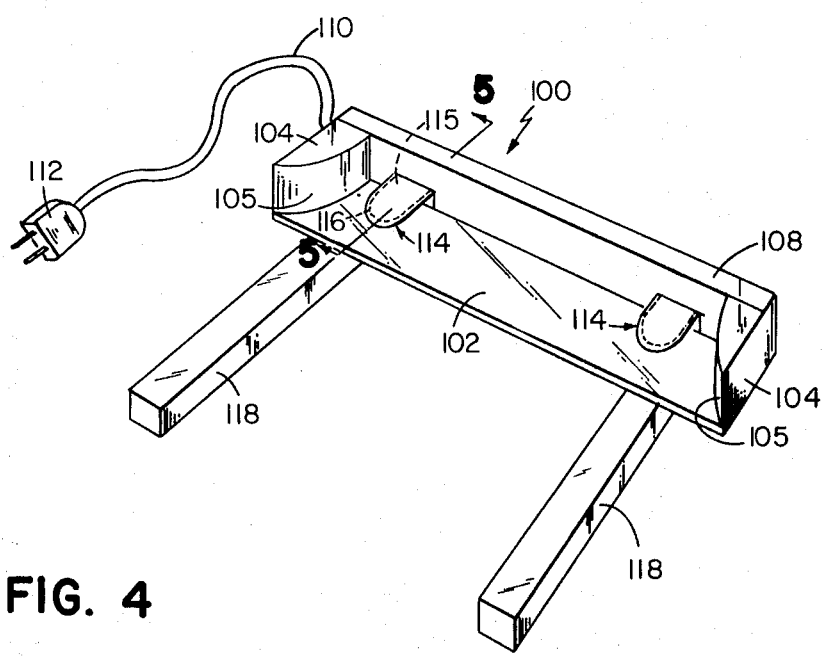
Figure 5:
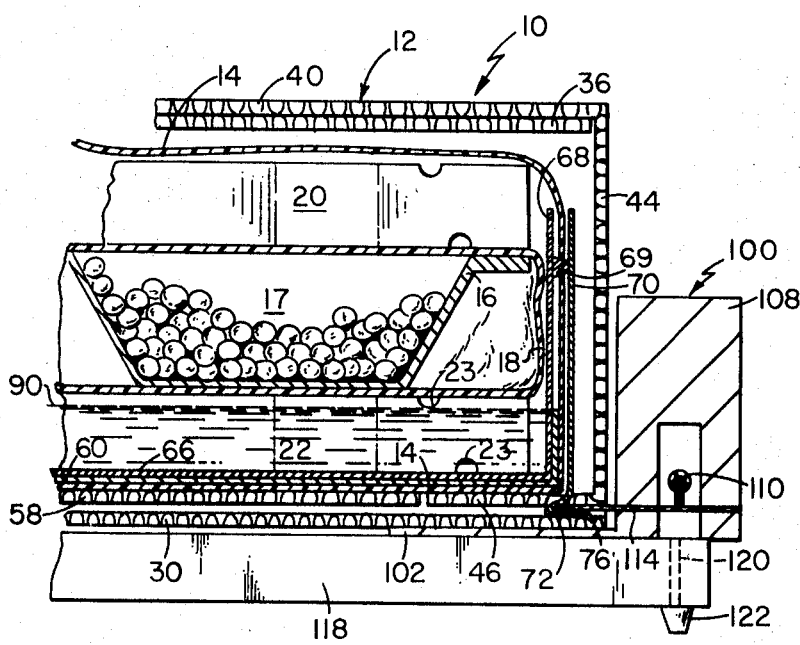

FIG. 4 is a perspective view of a connector assembly for use with the food package of FIG. 1; and FIG. 5 is a sectional view of the assembly of FIG. 4 along line 5—5 thereof, and a portion of the food package of FIG. 1 connected to this assembly. Referring more particularly to the drawings there is shown a food package, indicated generally at 10, including a container comprising an outer sheet 12 of 200 lb. test corrugated paper board folded into a box of 8 in. by 10 in. by 2 interior dimension, a standard (9 in. by 7 in.) frozen-dinner size food tray 16 (shown holding a frozen-type food product 17 in FIG. 5) enclosed in a sealed electrically nonconducting polyethylene sheet 18, an electrically nonconducting polyethylene sheet 14, 0.003 in. thick and (with trimmed corners) 1 yard square, gathered about all internal parts of the package, including food tray 16, and defining the interior surface of the container, and a pair of identical ½ inch high spacers 20, 22, each made of a network of interconnected strips of milk carton material having flow communicating openings 23 therethrough, disposed between polyethylene sheets 14 and 18 respectively above and below food tray 16.

Referring to FIGS. 1 and 3, box blank 12 (which provides structural strength and thermal insulation for the package both during storage and heating) includes a bottom panel 30, a first pair of side panels 32 secured to opposite transverse edges of bottom panel 30 along fold lines 31, and a third side panel 34 secured to a longitudinal edge of bottom panel 30 along a fold line 33 perpendicular to fold lines 31. An interior top half panel 36 is secured to each of side panels 32 along a fold line 35 parallel to fold lines 31. The portion of each half panel 36 opposite its fold line 35 includes a semicircular notch 38 which cooperates with the notch 38 on the other top half panel upon folding of the blank (FIG. 1) to form a 1½ inch diameter opening 38a. An exterior top panel 40 secured to side panel 34 along a fold line 39 includes a precut 3 inch in diameter circular portion 42 which is removed when the package is to be heated to expose a circular opening 42a. A fourth side panel 44 is secured to the edge of top panel 40 opposite side panel 34 along fold line 43 and a closure flap 46 is secured to side panel 44 along fold line 45 parallel to fold lines 33 and 39. A precut U-shaped tab 47 is provided in panel 44 and a pair of "T" shaped slots 48 are provided in closure flap 46. The crossbar of each slot is parallel to, and the leg of each slot is perpendicular to and intersects the transverse free edge 50 of flap 46. Support flaps 52 are connected to side panels 32 along fold lines 53 and support flaps 56 are connected to side panel 34 along fold line 57.

A flap spacer panel 58 having a length and thickness equal to that of bottom panel 30 (and closure flap 46) and a width equal to the width of bottom panel 30 less that of closure flap 46 is provided on top of the bottom panel.

When box blank 12 is folded into a food package (as in FIG. 1), the gathered portion 15 of polyethylene sheet 14 extends through opening 38a and is turned back around the opening and sealed to the top of interior half panels 36 between interior panels 36 and exterior panel 40 by Scotch brand Sand Blast Filler Type No. 2, manufactured by Minnesota Mining & Mfg. Co., precoated onto the top of half panels 36.

Referring to FIG. 2, a pair of electrodes (tinned steel strip 0.01 inch thick and ¾-inch wide) are heat bonded to a 9 inch by 7 inch insulating sheet 60 (polyethylene coated board milk carton material) in parallel spaced-apart relationship. Each electrode includes an inner portion 62 within the enclosure formed by sheet 14 and an outer portion 64 without sheet 14. Each inner portion 62 includes a horizontal section 66 bonded to insulating sheet 60 and a vertical section 68 including a dimple 69 which extends through a mating hole in sheet 14 into contact with a vertical section 70 of outer portion 64. The two portions are spot-welded together at the dimple to provide electrical connection therebetween and a watertight seal through the sheet.

The outer portion 64 of each electrode includes a substantially U-shaped, horizontal female connector 72 connected to vertical section 70 at right-angle bend 71. The tinned strip forming the lower portion of connector 72 is curved and includes at its free end a downwardly facing pointed tip 76.

When the food package is assembled, the outer portion 64 of each electrode extends through the crossbar of one of the "T" slots 48 in closure flap 46 (bend 71 engaging the slot), and connector 72 lies between closure flap 46 and bottom panel 30 with pointed tip 76 digging into the interior surface of bottom panel 30.

A deposit of salt 80 (approximately 6 grams) is dispersed at the bottom of the cavity formed by spacer 22 on insulating sheet 60 between electrode portions 66.

Referring to FIGS. 4 and 5, the connector assembly, indicated generally at 100, includes a thin supporting strip 102, side guides 104, each having a tapered portion 105 for easy insertion of a food package, and a guide bar 108, through which extends a power cord 110, carrying a plug 112 for connection to an AC powerline. Projecting from rear guide bar 108 are connectors 114, each formed of printed circuit board. The upper surface of each connector is nonconductive; the lower surface includes a central conductive portion 115 and a surrounding insulating portion 116 which provides for safe handling of assembly 100. Each conductive portion extends to the interior of guide bar 108 where it is connected to one lead of cord 110. Horizontally extending beams 118 are substantially aligned with strip 102 and support the remainder of package 10, each beam being pivoted about a pin 120 for folding back under strip 102 when not in use, and having foam rubber feet 122 at the front and rear therebeneath for steady, nonslip support of the package. An indicator lamp shunted by a suitable resistance and provided with a green filter (not shown) may be connected in series with one of connectors 114.

In operation, to heat and, as required cook, the frozen food contained in food tray 16, circular portion 42 of exterior top panel 40 is removed, exposing opening 42a, about 10 oz. of water is introduced into the cavity formed by sheet 14 (through openings 42a and 38a), flowing over and around the polyethylene sheet 18 surrounding tray 16 onto the insulating sheet 60. The water fills the cavity defined by polyethylene sheet 14 to a level (indicated at 90) just below the bottom of food tray 16 and dissolves salt 80 thereby forming a conductive aqueous solution. Sheet 14, with spacer 22, forms a pan for the conductive liquid and the openings 23 in spacer 22 permit flow of liquid horizontally therethrough to insure a substantially even liquid level.

The package 10 is connected to connector assembly 100 (FIG. 5) with connectors 114 of assembly 100 extending between closure flap 46 and bottom panel 30 and engaging connectors 72 of each electrode, and strip 102 and beams 118 of connector assembly 100 supporting the package.

When plug 112 of connector assembly 100 is connected to an AC source, current flow between the electrodes of the food package (through the conductive aqueous solution) builds up rapidly to its maximum level (illuminating the indicator light is one is provided) and heats the solution to its boiling point. Once the solution is boiling, the current flow automatically adjusts itself to the level (generally slightly less than the maximum and slowly decreasing) required to maintain continuous boiling. The steam produced surrounds, heats, and, as required, cooks the food in tray 16. Most of the steam, after performing some heating, condenses on the sheet 18 surrounding food tray 16 and on the top inside portion of sheet 14 and is returned as condensate to the boiling liquid pool below the food tray and between the electrodes. Some steam continually escapes through vent 38a, and, when enough water from the conductive aqueous solution has escaped (as steam) automatically causes the current flow between electrodes to rapidly decrease (extinguishing the indicator lamp if one is provided) and, finally, cease altogether.

In practice, the cooking cycle includes an initial period of about 5 minutes during which the water is heated to boiling, a cooking period (during which the water boils at a substantially constant rate) of 10 to 18 minutes duration, and a cutoff period (during which the current flow and boiling rapidly decrease). The exact length of each period depends on the initial temperature of the package and conductivity, salinity and quantity of the aqueous solution. The cutoff period may be as long as 10 or 12 minutes (if the water is permitted to boil off to the point where current flow completely ceases), but is generally shortened by disconnecting the package from connector assembly 100 when (as shown by dimming of the indicator lamp if used, or a substantial decrease in the amount of steam from vent 38a). the current flow and cycle have entered the cutoff region.

The conductive aqueous solution is the only heating element within the package and, throughout the cooking cycle, the highest temperature within the package itself is that of the boiling solution (which may be at or slightly above 212° F. depending on the salinity of the solution). The temperature of this liquid-vapor cooking element is automatically maintained at this fixed highest temperature throughout the major portion of the cycle.

As indicated, a completely frozen food product can be cooked and ready to eat in a total time of approximately 20 minutes, as compared with the 40 to 45 minutes (including a preheat time of at least 10 minutes) required to cook a similar frozen dinner in an oven.

Before package 10 can be opened, it must be removed from connector assembly 100, the opening tab 47 being blocked by guide bar 108 of assembly 100 when the package is connected thereto, thereby providing a safety interlock system. After being disconnected, the package is opened by grasping tab 47 and pulling on flap 44, thereby opening exterior top panel 40 and, at the same time, bending and distorting the electrodes and adjacent portions of the package by virtue of the attachment of the electrodes to closure flap 46 by "T" slots 48. The package, once opened, is thus difficult, if not impossible to reassemble and reuse, increasing its safety.

Other embodiments within the scope of the following claims will occur to those skilled in the art.

What is claimed is:

1. A disposable food package comprising:
   a container having a cavity interior thereto;
   a vapor vent in the upper portion of said package extending from said cavity to the exterior of said package;
   a pair of electrodes mounted within said cavity in spaced apart relationship;
   a compartment containing a quantity of food; and, means for supporting said compartment within said cavity spaced from said electrodes,
   said container including an outer box of paperboard and within said paperboard a layer of electrically-nonconducting, moisture resistant material defining at least a portion of said cavity.

2. The food package of claim 1 wherein the material defining the outer surface of said compartment is electrically nonconducting and moisture resistant.

3. The package of claim 1 wherein said electrodes are secured, in said spaced-apart relationship, to a sheet of electrically nonconductive material disposed within said cavity.

4. The food package of claim 3 wherein each of said electrodes includes a connector portion without said cavity and within said package.

5. A disposable food package comprising:
   a container having a cavity interior thereto;
   a vapor vent in the upper portion of said package extending from said cavity to the exterior of said package;
   a pair of electrodes mounted within said cavity in spaced apart relationship;
   a compartment containing a quantity of food; and
   means for supporting said compartment within said cavity and spaced from said electrodes,
   said cavity being defined by a flexible, moisture resistant, electrically nonconducting sheet surrounding said food compartment, and said electrodes extending sealingly through said sheet.

6. The food package of claim 5 wherein each said electrode includes a first portion within said sheet and a second portion outside of said sheet, said portions being spot-welded together through an opening in said sheet.

7. A disposable food package comprising:
   an outer box having a cavity interior thereto;
   a flexible sheet of moisture resistant, electrically-insulating material within said box defining at least a portion of said cavity;
   a vapor vent in the upper portion of said package extending from said cavity to the exterior of said box;
   a pair of electrodes mounted within said cavity in spaced apart relationship;
   a compartment containing a quantity of food; and,
   means for supporting said compartment within said cavity and spaced from said electrodes;

8. The package of claim 7 wherein the upper surface of said box includes an opening therethrough and said flexible sheet includes a first portion gathered about said food compartment and a second portion extending through said opening and defining said vapor vent.

9. The food package of claim 7 wherein the lower portion of said box includes a bottom panel and an interior sheet portion overlying a portion of said bottom panel, and each of said electrodes includes a connector portion without said cavity and within said package disposed between said bottom panel and said interior sheet portion.

10. The food package of claim 7 wherein said box is of corrugated paper board.

11. A disposable food package comprising:
    a container having a cavity interior thereto;
    a vapor vent in the upper portion of said package extending from said cavity to the exterior surface of said package;

a pair of electrodes mounted within said cavity in spaced apart relationship;

a compartment containing a quantity of food; and, means including a spacer below said food compartment between said food compartment and the interior bottom surface of said container for supporting said compartment within said cavity spaced from said electrodes, said means having communicating openings therein for maintaining a liquid medium at a substantially even level in the space beneath said food compartment.

12. The package of claim 11 including a second spacer member above said compartment between said food compartment and said interior surface.

13. The package of claim 12 wherein said spacers are substantially identical spacing members.

14. A disposable food package comprising:
a substantially closed rectangular outer box having a cavity interior thereto including
a bottom panel,
four surrounding side panels,
and
a top panel,
said top panel defining an opening therethrough providing a vapor vent and each of said panels being connected to another of said panels along a respective fold line;
a compartment containing a quantity of food disposed within said cavity; and,
a pair of electrodes mounted within said cavity in spaced apart relationship below said food compartment.

15. The package of claim 14 wherein said box is paperboard, said cavity is defined by moisture resistant, electrically-nonconducting material within said outer box.

16. The disposable food package of claim 14 including a flexible sheet of electrically-insulating, moisture resistant material including a first portion gathered about said food compartment and an interior portion of each of said electrodes and a second portion extending upwardly through said opening in said inner panel and outwardly intermediate said inner and outer panels.

17. The package of claim 14 wherein said box includes an inner top panel and an outer top panel, said inner top panel defining an opening therethrough providing a vapor vent and said outer top panel defining a second opening of greater area than and overlying the opening in said inner panel.

18. The package of claim 17 wherein said inner top panel includes two inwardly foldable half-panels secured to opposing side panels, each half-panel including a semicircular notch in its inner edge, said notches being adapted for mating to define said opening in said inner top panel.

19. The package of claim 18 wherein said box includes an inwardly folded flap secured to an edge of said outer top panel, said flap having a pair of spaced slits therein for receiving electrodes of said package and overlying an interior portion of said bottom panel.

20. A disposable food package comprising:
a container having a cavity interior thereto;
a vapor vent in the upper portion of said package extending from said cavity to the exterior of said package;
a pair of electrodes mounted within said cavity in spaced apart relationship,
a compartment containing a quantity of food;
means for supporting said compartment in said cavity spaced from said electrodes,
means for opening said container to remove said compartment therefrom; and,
means cooperating with said electrodes, said container and said opening means for destructively distorting portions of said electrodes and said container upon opening of said container with said opening means.

21. The package of claim 20 wherein said container comprises a substantially rectangular box at least in part of paperboard.

22. The package of claim 20 wherein said cavity is defined by moisture resistant, electrically-nonconducting material.

23. The package of claim 22 wherein said electrodes extend sealingly through said material.

* * * * *